United States Patent [19]

Yoshimura

[11] Patent Number: 5,136,678
[45] Date of Patent: Aug. 4, 1992

[54] OPTICAL WAVE GUIDE ARRAY
[75] Inventor: Chisato Yoshimura, Nagoya, Japan
[73] Assignee: Brother Kogyo Kabushiki Kaisha, Nagoya, Japan
[21] Appl. No.: 630,216
[22] Filed: Dec. 19, 1999
[30] Foreign Application Priority Data Feb. 19, 1990 [JP] Japan .................................. 2-38134

[51] Int. Cl.$^5$ ............................................. G02B 6/10
[52] U.S. Cl. ..................................... 385/132; 430/321
[58] Field of Search ............... 350/96.10, 96.11, 96.12, 350/96.20, 96.21, 96.22, 96.24; 430/320, 321, 322, 324; 385/129, 130, 131, 132

[56] References Cited

U.S. PATENT DOCUMENTS

| | | | |
|---|---|---|---|
| 3,767,445 | 10/1973 | Chandross et al. | 350/96.12 X |
| 4,409,477 | 10/1983 | Carl | 350/96.24 X |
| 4,883,743 | 11/1989 | Booth et al. | 430/321 |
| 5,015,059 | 5/1991 | Booth et al. | 350/96.21 X |
| 5,061,029 | 10/1991 | Ishikawa | 385/132 |

FOREIGN PATENT DOCUMENTS

| | | |
|---|---|---|
| 55-120004 | 9/1980 | Japan . |
| 59-187304 | 10/1984 | Japan . |
| 61-138903 | 6/1986 | Japan . |
| 62-69207 | 3/1987 | Japan . |

Primary Examiner—John D. Lee
Attorney, Agent, or Firm—Oliff & Berridge

[57] ABSTRACT

An optical wave guide array is used in an optical recording apparatus. The array comprises a clad substrate made of a resin material resistant to a UV curable resin and having a number of grooves arranged in lines on the surface thereof, core portions for optical wave guides formed by filling a UV curable resin in the respective grooves and curing the resin by irradiation of UV light, and a covering clad portion for covering the clad substrate and core portions.

18 Claims, 2 Drawing Sheets

OPTICAL WAVE GUIDE ARRAY

BACKGROUND OF THE INVENTION

1. Field of the Invention

This invention relates to an optical wave guide array adapted for use in optical recording apparatus.

2. Description of the Related Art

In recent years, optical recording apparatus using an optical wave guide array wherein a great number of optical wave guides are arranged in lines, have been employed instead of optical recording apparatus using fθ lenses.

Such an optical wave guide array has been heretofore fabricated according to an injection molding technique or a selective polymerization technique.

In the injection molding technique, a resin having a low refractive index is injected into a mold to form a substrate also serving as a clad substrate wherein a multitude of grooves at equal pitches are formed. Subsequently, a part of the mold is removed, after which a core material-filling mold is placed so that cavities are formed at the positions where the grooves have been formed in the clad substrate. A core material having a high refractive index is packed in the respective cavities to form a core portion. Thereafter, a covering material serving as a clad portion is used to cover the clad substrate and the core portion to provide an optical wave guide array. In the injection molding techniques described above, polycarbonates, polymethyl methacrylate and polystyrene have been in use as optically transparent, injection-moldable materials. For instance, when the optical wave guide array is made from a combination of polycarbonate and polymethyl methacrylate, the polymethyl methacrylate having a relatively small refractive index is used as the clad substrate and the polycarbonate having a relatively great refractive index is employed as the core portion.

On the other hand, in the selective polymerization technique, a UV-curable resin is irradiated with an ultraviolet ray through a mask to make a difference in refractive index between the UV-irradiated portion and the mask-shielded substrate, thereby forming a clad portion and a core substrate, followed by covering the clad portion and the core portion with a material having a low refractive index and serving also as a clad portion to obtain an optical wave guide array.

However, in the injection molding technique, when the core material is filled in the grooves of the clad (substrate), the cladding material of the substrate provided in the mold has to be heated to a temperature necessary for the filling of the core material. This invites thermal expansion of the cladding material, sometimes leading to deformation of the grooves. For example, when the core material used is a polycarbonate, the mold temperature at which the polycarbonate is injected is as high as approximately 100° C. If a resin such as polymethyl methacrylate or polystyrene is used as a cladding material for the substrate, the cladding material is softened and is likely to undergo thermal deformation of the grooves. The injection pressure for filling the core material in the grooves of the clad substrate is required to be approximately 500 kg/cm$^2$ even if a resin having good fluidity is used. Thus, the grooves of the clad substrate (which has been thermally expanded or softened) are further subjected to the injection pressure of the core material, making it difficult to fabricate an optical wave guide array with a precise dimensional accuracy owing to the deformation of the grooves. Further, where the core portion has a size on the order of micrometers, fabrication of the clad substrate by the injection molding technique is possiible, with the problem, that an extreme difficulty is involved in filling the core material in the grooves of the clad substrate. Moreover, if the groove size of the clad substrate is small, there arises a problem on the releasability between the mold for forming the clad substrate and the grooves of the clad substrate, with an attendant problem that a part of the clad substrate may be broken.

On the other hand, in the selective polymerization technique, since the core substrate and the clad portion are simultaneously formed according to the polymerization reaction caused by UV irradiation, the interface between the clad substrate and the core portion becomes indefinite, with the problem that the transmission efficiency of a light beam is lowered. After the UV irradiation, the clad substrate and the core portion have to be bonded with a film and a reinforcing material, so that it has been difficult to attain a good registration accuracy between the clad substrate and the core portion. For solving these problems, there is known a method wherein a substrate is fabricated by injection molding and a core material is filled in the grooves of the substrate at normal temperatures and pressures. In this case, the core material is required to be a liquid wherein volatile components are contained in small amounts and which has a low viscosity. In general, UV-curable resins are most suitable for this purpose.

Ordinarily employed UV curable resins are acrylic resins such as of acrylic esters, urethane acrylates, epoxy acrylates and the like. However, a problem is involved in that polymethyl methacrylate ordinarily used as the substrate is attacked by the UV-curable resins. In order to solve this problem, it may occur that fluorine-containing resins which are resistant to acrylic resins are used as the cladding material. The fluorine-containing resins are expensive, with an attendant problem that the fabrication costs of the optical wave guide array become high.

SUMMARY OF THE INVENTION

Accordingly, it is an object of the present invention to overcome the above problems and to provide an optical wave guide array which is inexpensive, easy to prepare, has improved dimensional accuracy with respect to a fine core portion and a high beam transmission efficiency.

The above and further objects and novel features of the invention will be achieved by an optical wave guide array which comprises:

(a) a clad substrate having a number of grooves arranged in lines on a surface thereof and made of a resin material which has a resistance to a UV curable resin;

(b) a core portion for optical wave guides which is filled in the respective grooves of the clad substrate and formed of a UV-cured resin; and (c) a covering clad portion formed on the surface of the clad substrate so that the core portion is covered.

According to the invention, the clad substrate is formed of, for example, a methylpentene polymer which is resistant to UV-curable resins, so that the core portion can be formed by application and curing of the UV-curable resin. For the formation of the core portion, it is not necessary to heat the clad substrate as in the known injection molding technique and to fill the core material at a high pressure. Accordingly, the resultant optical wave guide array has a precise dimensional accuracy. As compared with an optical wave guide array fabricated according to the known selective polymerization technique using UV curable resins, the array of the invention has a clearer boundary between the core portion and the clad substrate. Accordingly, during beam transmission, the incident light beam efficiently undergoes total reflection at the interface between the core portion and the clad substrate. Moreover, the methylpentene polymer used as the clad portion has good releasability, with the possibility that fine clad portions can be formed.

BRIEF DESCRIPTION OF THE DRAWINGS

The invention will be described in detail with reference to the following drawings, wherein.

DETAILED DESCRIPTION OF THE PREFERRED EMBODIMENTS

A detailed description of one preferred embodiment of an optical wave guide array embodying the present invention will now be given referring to the accompanying drawings.

Figure 1:
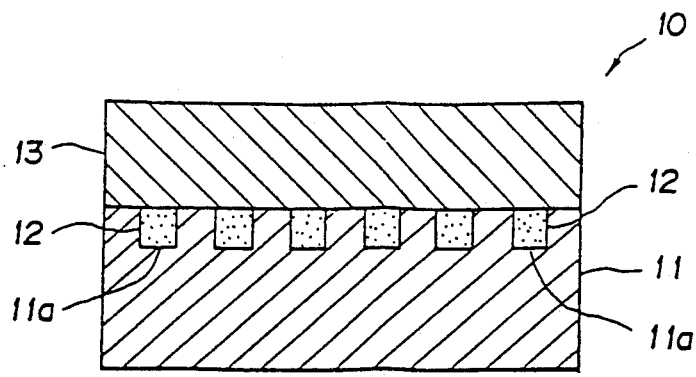
FIG. 1 is a sectional view of an optical wave guide array according to the invention.

As shown in FIG. 1, an optical wave guide array 10 includes a clad portion 11 serving also as a substrate, core portions 12 and a covering clad portion 13 serving as a cover.

The clad substrate 11 is a flat member having a number of grooves 11a formed on a predetermined mirror finished surface. The clad substrate portion 11 is formed by injection molding of a methylpentene polymer having a refractive index of 1.463.

The core portions 12 are formed by filling a UV curable resin in the respective grooves 11a of the clad substrate portion 11 and curing the resin by irradiation with a UV ray. The UV curable resins may be those having a refractive index of from 1.5 to 1.7, preferably from 1.53 to 1.57 and include, for example, acrylic esters curable at normal temperatures and pressures.

The covering clad portion 13 is a flat member for covering the clad substrate portion 11 and the core portions 12 formed in the grooves 11a of the clad substrate portion 11. The covering clad portion 13 is formed of a material which is the same as or close to the methylpentene polymer used as the clad substrate portion 11 with respect to the refractive index. In general, the covering clad portion 13 is formed of a UV curable resin such as trimethylolpropane-p,o-modified triacrylate which is a kind of acrylic ester. After cured by UV light, the cured triacrylate product has a refractive index of 1.49. The reason why the UV curable resin is used as the covering clad portion 13 is that with an injection molded resin, the clad substrate portion 11 in which the core portions 12 have been formed is again placed in a mold to form the covering clad portion 13, with the possibility that the clad substrate portion 11 and the core portions 12 are liable to deform by the action of heat and pressure.

The fabrication of the optical wave guide array 10 is described with reference to FIGS. 2(a) and 2(b).

Figure 2A:
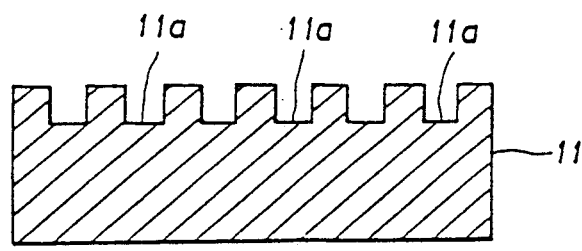
FIGS. 2(a) and 2(b) are, respectively, illustrative views of a method/for fabricating an optical wave guide array according to the invention.

Methylpentene polymer having a refractive index of 1.463 is injection-molded in a mold to form the flat clad substrate portion 11 having a number of grooves 11a at equal intervals formed on one surface as shown in FIG. 2(a).

Figure 2B:
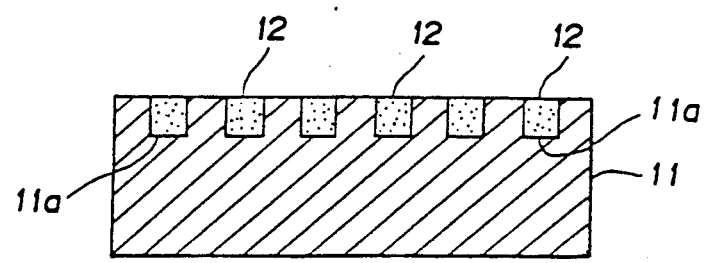

Next, as shown in FIG. 2(b), an acrylic ester used as a UV curable resin having a refractive index of approximately from 1.53 to 1.57 is filled, as a core material, in the respective grooves 11a of the clad substrate portion 11 for formation of the core portions 12. The core material is an acrylic ester with a low viscosity and can be readily filled. Since the core material can be filled at normal temperatures and normal pressures, no thermal deformation takes place in the grooves 11a of the clad substrate portion 11, thereby ensuring that the core portions 12 have a precise accuracy. The cladding material used for the substrate is a methylpentene polymer and the clad substrate portion is not attacked by means of the acrylic ester.

The core material is irradiated with UV light from a UV light source not shown to cure the core material, thereby forming the core portions 12.

Finally, a spin coating, spray coating or casting method is used to cover the clad substrate portion 11 and the core portions 12 formed in the grooves 11a of the clad substrate portion 11 with a UV cured resin to form the covering clad portion 13. Thus, the optical wave guide array 10 shown in FIG. 1 is obtained.

In order to increase the adhesion of the clad substrate portion 11, the core portions 12 and the cover 13, the clad substrate portion 11 may be surface-treated, for example, by flame treatment or treatment with chronic acid on the surface where the grooves 11a have been formed. By this treatment, adhesion is improved and a better optical wave guide array can be obtained.

Figure 3:
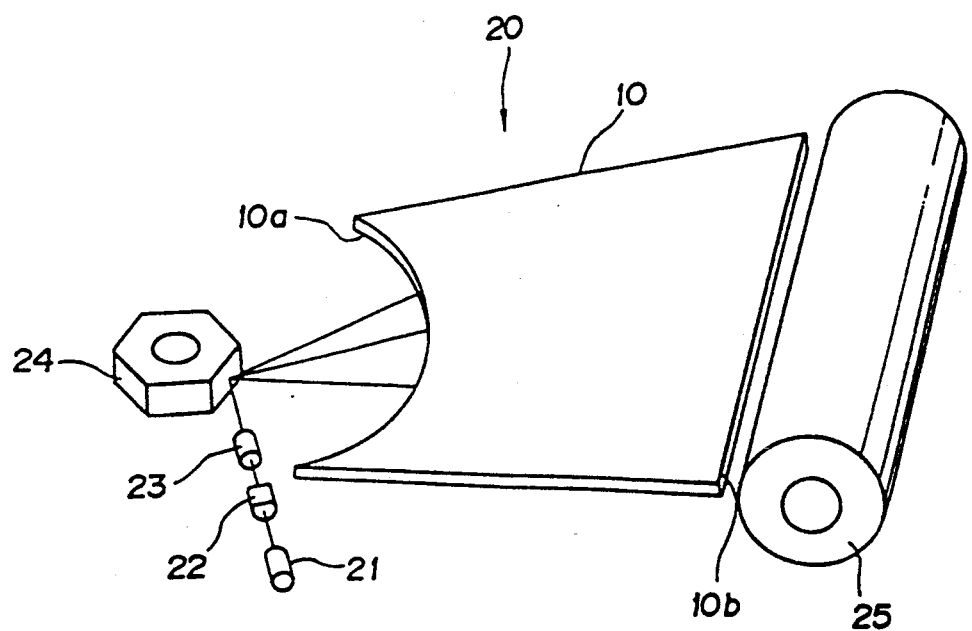
FIG. 3 is a perspective view of an optical recording apparatus using an optical wave guide array according to the invention.

FIG. 3 shows an optical recording apparatus 20 using the optical wave guide area 10 according to the invention. In the optical recording apparatus 20, a light beam emitted from a light source 21 according to image information is passed through a collimator lens 22 to form parallel beams, followed by passing through a condenser lens 23 and deflecting at a conformal angle with a polygon mirror 24 rotating at a given rate. The deflected light beams are directed in a main scanning direction and are successively entered or inputted into the respective core portions 12 (FIG. 1) of an optical fiber array at an incident end 10a of the optical wave guide array 10. The light beams entering into the core portions 12 are transmitted through the core portions 12 in the relationship among the core portions 12, the clad substrate portion 11 and the cover 13 of the optical wave guide array 10 with respect to the refractive index. The light beams are successively outputted from the respective core portions 12 at an output end 10b and are scanned on a rotary photosensitive drum 25 along a line parallel to the rotary axis of the drum at equal rates.

Whenever optical scanning per line is completed, the photosensitive drum 25 is intermittently rotated in a sub-scanning direction by a drive control means not shown, followed by repeating of the optical line scanning, to thereby carry out image recording.

In FIG. 3, the core portions need not be necessarily arranged at equal pitch intervals because it is sufficient that the optical wave guide array precisely transmit scanning light between the two end surfaces of the clad substrate (i.e., the input and output ends). It is important, however, that the grooves (core portions) are formed at equal pitch intervals on at least one end surface, and preferably on the two end surfaces, of the clad substrate for precise light scanning and printing.

The present invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical wave guide array, comprising:
   (a) a clad substrate having a number of grooves arranged in lines on the surface thereof and made of a methylpentene polymer;
   (b) a core portion for optical wave guides which is filled in the respective grooves of said clad substrate and formed of a UV-cured resin; and
   (c) a covering clad portion formed on the surface of said clad substrate so that said core portion is covered.

2. The array according to claim 1, wherein said clad substrate is an injection-molded product.

3. The array according to claim 1, wherein said core portion is an acrylic ester filled in the grooves without deformation of the grooves.

4. The array according to claim 1, wherein a material for said covering clad portion is a UV curable resin.

5. The array according to claim 4, wherein the UV curable resin of the covering clad portion has a refractive index substantially equal to a refractive index of the clad substrate.

6. The array according to claim 1, wherein the clad substrate has two end surfaces where the grooves are terminated and the grooves of said clad substrate are formed at equal intervals on at least one end surface.

7. An optical recording apparatus, comprising:
   a light source for emitting light signals based on image information;
   an optical scanning means for deflecting the light signals emitted from said light source in a main scanning direction;
   an optical wave guide array which has optical wave guides arranged in lines in the main scanning direction of the light signals deflected by said optical scanning means, the light signals being successively introduced into the respective optical wave guides from one end of the optical wave guides and being outputted from the other end of the optical wave guides; and
   a photosensitive material on which the light signals outputted from said optical wave guide array are irradiated in the main scanning direction;
   said optical wave guide array comprising (a) a clad substrate having a number of grooves arranged in lines on the surface thereof and made of a methylpentene polymer, (b) a core portion for the optical wave guides which is filled in the respective grooves of said clad substrate and formed of a UV-cured resin, and (c) a covering clad portion formed on the surface of said clad substrate so that said core portion is covered.

8. The apparatus according to claim 7, wherein said clad substrate is an injection-molded product.

9. The apparatus according to claim 7, wherein said core portion is an acrylic ester filled in the grooves without deformation of the grooves.

10. The apparatus according to claim 7, wherein a material for said covering clad portion is a UV curable resin.

11. The apparatus according to claim 10, wherein the UV curable resin of the covering clad portion has a refractive index substantially equal to a refractive index of the clad substrate.

12. The apparatus according to claim 7, wherein the clad substrate has two end surfaces where the grooves are terminated and the grooves of said clad substrate are formed at equal intervals on at least one end surface.

13. The apparatus according to claim 7, further comprising a control means for intermittently moving said photosensitive material in a sub-scanning direction whenever the light information outputted from said optical wave guide array is irradiated in the main scanning direction of the surface of said photosensitive material.

14. A method for fabricating an optical wave guide array comprising the steps of:
   forming a clad substrate having a number of grooves arranged in lines on the surface thereof by injection-molding of a methylpentene polymer;
   filling a UV curable resin in the respective grooves of the clad substrate and irradiating the UV curable resin with a UV ray to cure the resin, thereby forming core portions of optical wave guides; and
   forming a covering clad portion on the surface of said clad substrate so that said core portions are covered.

15. The method according to claim 14, wherein said core portions are an acrylic ester filled in the grooves without deforming the grooves.

16. The method according to claim 14, wherein a material for said covering clad portion is a UV curable resin.

17. The method according to claim 14, wherein the clad substrate has two end surfaces where the grooves are terminated and the grooves of said clad substrate are formed at equal intervals on at least one end surface.

18. The method according to claim 14 wherein the covering clad portion has a refractive index substantially equal to a refractive index of the clad substrate.

* * * * *

UNITED STATES PATENT AND TRADEMARK OFFICE
CERTIFICATE OF CORRECTION

PATENT NO. : 5,136,678
DATED : August 4, 1992
INVENTOR(S) : Chisato YOSHIMURA

It is certified that error appears in the above-identified patent and that said Letters Patent is hereby corrected as shown below:

Title page, item [22], change "1999" to --1990--.

Signed and Sealed this

Twenty-fourth Day of August, 1993

Attest:

BRUCE LEHMAN

Attesting Officer     Commissioner of Patents and Trademarks